March 16, 1971 J. A. FINNEY, JR 3,570,218
ELECTRODE CONFIGURATION IN AN ELECTRICAL PRECIPITATOR
Filed Dec. 11, 1968 2 Sheets-Sheet 1

INVENTOR:
James A. Finney, Jr.

BY: *James R. Hoatson, Jr.*
*Philip T. Liggett*
ATTORNEYS

March 16, 1971     J. A. FINNEY, JR     3,570,218

ELECTRODE CONFIGURATION IN AN ELECTRICAL PRECIPITATOR

Filed Dec. 11, 1968     2 Sheets-Sheet 2

INVENTOR:
James A. Finney, Jr.

BY:
James R. Hoatson, Jr.
Philip T. Liggett
ATTORNEYS

# United States Patent Office 3,570,218
Patented Mar. 16, 1971

3,570,218
ELECTRODE CONFIGURATION IN AN ELECTRICAL PRECIPITATOR
James A. Finney, Jr., Greenwich, Conn., assignor to Universal Oil Products Company, Des Plaines, Ill.
Filed Dec. 11, 1968, Ser. No. 783,002
Int. Cl. B03c 3/74
U.S. Cl. 55—118
6 Claims

ABSTRACT OF THE DISCLOSURE

An improved liquid film electrical precipitator in which each charging electrode wire is located between and maintains electric fields with respect to several separate collector electrodes. A liquid supply means carries liquid to the exterior surfaces of the collector electrodes. Preferably, the lower portions of the collector electrodes terminate in downward vertical points. Downward extensions passing through these points pass between the charging electrodes and the stabilizing and linking apparatus associated with the charging electrodes.

---

This invention relates to an improved electrical precipitator. More particularly this invention is, in a liquid film electrical precipitator, the improvement comprising charging electrodes each of which is located between and maintains electric fields with respect to several separate collector electrodes. A liquid supply means carries liquid to the exterior surfaces of the collector electrodes. Preferably, the collector electrodes have lower portions which terminate in vertical points so that downward vertical extensions passing through these vertical points pass between charging electrode wires, charging electrode weights, and charging electrode connection links.

Conventional liquid film electrical precipitators are normally comprised of a multiplicity of wires, which are charging electrodes, vertically suspended through collecting electrodes formed by a multiplicity of hollow pipes. The charging electrode wires are weighted at their lower extremities, at a level below the hollow pipes, to insure axial relationship with respect to the hollow pipes. The charging electrode wires are cross-connected at the weights to laterally stabilize the wires in order to minimize arcing. High voltage is applied to the charging wires while the collector electrodes are grounded. A liquid, usually water, is supplied to the upper portions of the hollow pipes and flows down the interior walls of the pipes in a laminar film, thereby carrying away particles attracted to and deposited upon the collector electrodes from the gas to be cleaned. Without a washing film of liquid, these particles would build up on the collector electrodes and eventually impair the operation of the electrical precipitator. The film of liquid flowing down the interior walls of the hollow pipes drips from the pipes into a collection basin or other container from which the liquid is drained.

This conventional arrangement poses several operational problems which are solved by the present invention. In the conventional liquid film electrical precipitators, the liquid flow down the interior walls of the pipes must be closely regulated at a minimal level, so that water flowing from a pipe will fall as droplets, and not in a stream. Formation of droplets by the descending liquid is conventionally aided if the lower edges of the pipes are cut as flat, horizontal surfaces. Thus, a construction of the collector electrode pipes to achieve this is normally attempted. Flow regulation is necessary because the descending water, by necessity of the geometrical arrangement of the collector electrodes and charging electrodes, falls upon connection links which join and stabilize adjacent charging electrode wires. When the falling liquid descends as streams, short circuits are formed from the charging electrodes across the surfaces of the connecting links, and up the streams of water to the collector electrodes. This short circuiting consumes unnecessary quantities of electricity and interferes with the performance of the electrical precipitator. Heretofore, the only effective way of preventing these short circuits from occurring has been to insure that the falling water descends as drops, rather than in streams, thereby breaking up the path of potential short circuits. In addition to closely controlled flow regulation, maintenance of only a minimal water flow is also necessary to prevent the water from descending from the collecting electrodes in streams. This minimal allowable flow is often insufficient to adequately carry away the particles attracted to and deposited on the walls of the collector electrode pipes. A build up of substances on the interior walls of the collector electrodes often occurs and eventually results in arcing between the charging electrode wires and the collector electrode pipes.

The present invention utilizes a change of geometrical relationship of the collector electrodes with the charging electrode wires, and in the preferred form, an improved construction of collector electrodes to solve the problems previously described.

It is an object of the invention to prevent short circuits from forming between the charging electrodes and the collector electrodes across the surface of connecting links joining the charging electrode wires, and back through a descending stream of liquid.

It is a further object to render unnecessary both maintenance of a minimal liquid flow and a close regulation of liquid flow on the collecting surfaces of the collector electrodes.

Another object is to allow an adequate liquid flow to be provided to prevent a build up of collected particles on the collector electrodes, thereby preventing arcing or discharge from the charging electrodes through the collected particles on the surfaces of the collector electrodes.

Still another object is to provide a convenient means for supplying liquid to the collecting surfaces of the collector electrodes.

In a broad aspect this invention is, in a liquid film electrical precipitator, the improvement comprising vertical collector electrodes, vertical charging electrode wires each located between and maintaining electric fields with several separate collector electrodes, and a liquid supply means for carrying liquid to exterior surfaces of the collector electrodes.

The concept of electrode configuration in the present invention departs from that of the conventional electrical precipitator. In a conventional electrode configuration, the charging wire extends axially through a hollow pipe, the interior surface of which forms the collecting surface of the collector electrode. Since the charging wires are stabilized by weights suspended from their extremities and by the lateral interconnection of the charging wires through the use of connecting links, the paths of the descending water as determined by vertical downward extensions of the collector electrodes, necessarily intersect the connecting links. In the improved electrical precipitator utilizing this invention, each charging electrode wire is not surrounded by a surface of a single collector electrode, but is instead located between several separate collector electrodes. Thus, charging electrodes can be laterally joined to each other by connecting links which do not pass directly underneath vertically downward extensions of the collector electrodes. This spacial relationship of the collector electrodes with the charging electrodes allows water to flow down the surfaces of the collector electrodes without striking the charging electrodes or any links or weights supporting the charging electrodes.

In the preferred embodiment of this invention, each of the collecting electrodes terminates in a lower portion having at least one vertical point, and weights are suspended from each of the charging electrode wires, and connection links pass between vertical extensions from the vertical collecting electrode points and are connected to adjacent charging electrode wires at the aforesaid weights, thereby interconnecting and stabilizing said charging electrode wires. This construction insures that the liquid flowing from the collector electrodes will flow in steady or intermittent streams along selected vertical lines rather than dripping or flowing in steady or intermittent streams from various points along a horizontal edge. The liquid flow is thereby stabilized along vertical lines which can be arranged to present the smallest possibility of a short circuit between electrodes.

The principal feature of all forms of this invention is that the water flows from the collector electrodes while not intersecting any portion of the structure supporting or restraining the charging electrodes.

The various features of this invention are further illustrated in the accompanying drawings in which.

Figure 2:
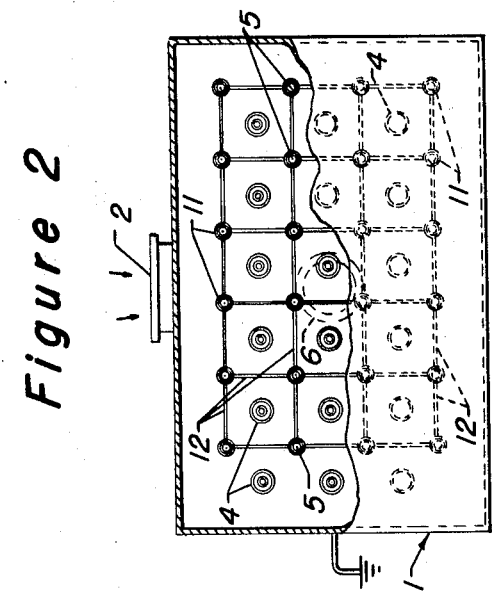
FIG. 2 is a sectional view along lines 2—2 of FIG. 1.
Figure 3:
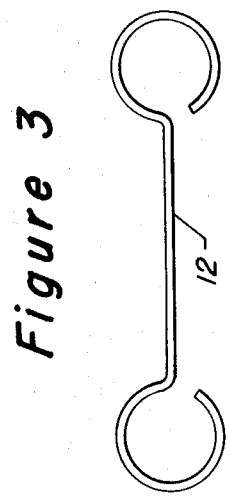
FIG. 3 is an enlarged view of the connection links of FIGS. 1 and 2.
Figure 1:
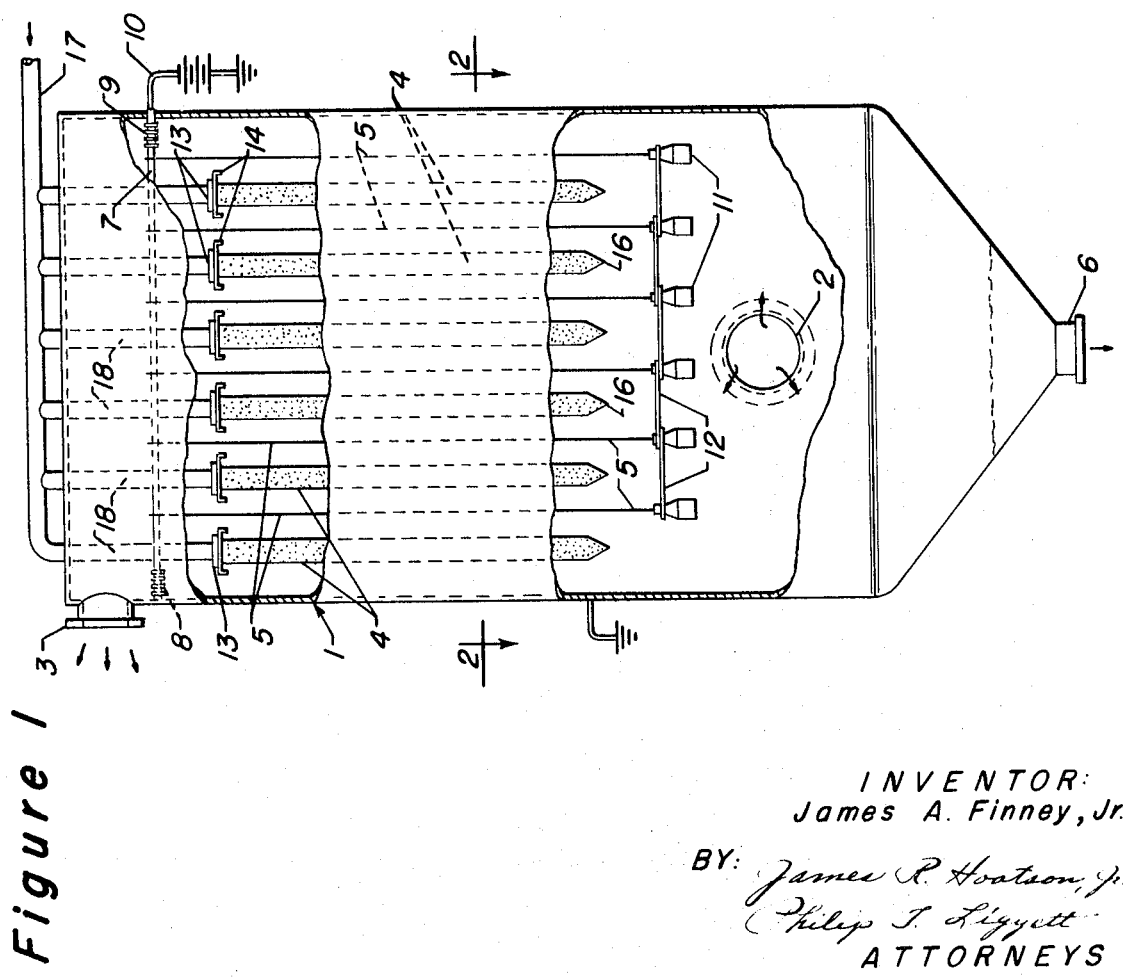
FIG. 1 is a partially cutaway elevational view of the preferred embodiment of this invention as used in a liquid film electrical precipitator.

Referring now to FIG. 1, there is illustrated an electrical precipitator 1 having a dirty gas inlet 2, a cleaned gas outlet 3, and a liquid drain 6. Suspended within the electrical precipitator are vertical collector electrodes 4 and vertical charging electrode wires 5. Charging electrode wires 5 may be constructed of stainless steel, brass, or a variety of other connective materials. Charging electrode wires 5 are fastened to and suspended from rigid conductive supports 7, which are fastened to the walls of electrical precipitator 1 by insulators 8 and 9. Insulators 8 are attached to the precipitator wall and insulators 9 are embedded in and extend through the wall of electrical precipitator 1, thereby allowing wires 10 which are connected to a large direct current potential to make electrical contact with support 7 without short circuiting to ground through the walls of electrical precipitator 1. Attached to the lower ends of charging electrode wires 5 are weights 11, which maintain charging electrode wires 5 in tension. Connecting links 12 connect adjacent charging electrode wires 5 at weights 11 in directions both perpendicular to and parallel to the plane of FIG. 1, thereby laterally restraining charging electrode wires 5. The connecting links used may be any rigid or semi-rigid means connecting adjacent charging electrode wires 5. The preferred form of the connecting links is connecting link 12, several of which are shown in FIGS. 1 and 2. An enlarged illustration of a connecting link 12 is more clearly shown in FIG. 3. Connecting link 12 in FIG. 3 is comprised of a central rigid linear portion with hooked portions extending from each end of the central portion. As shown most clearly in FIG. 2, there are four connecting links 12 restraining each interior charging electrode wire 5. Furthermore the connecting links 12 are arranged to pass between downward vertical extensions passing through the vertical points 16 of collector electrodes 4. Connecting links 12 are connected to and join adjacent charging electrode wires 5 at the weights 11 suspended from wires 5 thereby interconnecting and stabilizing the charging electrode wires 5. Collector electrodes 4 each have a collar 13 fastened at their upper ends. The lower portions of collector electrodes 4 pass through holes in rigid structural supports 14 and are thereby suspended form supports 14 by collars 13, which do not pass through these holes. Supports 14 extend perpendicular to the plane of FIG. 1 and are fastened to the walls of electrical precipitator 1, thereby grounding collector electrodes 4. The geometrical configuration of the charging electrodes 5 with the collector electrodes 4 is more clearly illustrated in FIG. 2 where it can be seen that the vertical charging electrode wires 5 are located between and maintain electric fields with each of several separate collector electrodes 4. In this embodiment, each of collector electrodes 4 is a hollow, porous structure having an upper portion and having a lower portion which terminates in a single downward vertical point 16. There collector electrodes must be electrically conductive to the extent of at least about 10 milliamperes per one thousand square feet of surface. One satisfactory manner of construction of the collector electrodes is interior and exterior surfaces of perforated stainless steel and porous foamed plastic of controlled porosity packed between the interior and exterior surfaces. Water to carry away particles collected from the gas to be cleaned is introduced to electrical precipitator 1 by a liquid supply means for carrying liquid to the exterior surfaces of the collector electrodes. The liquid supply means comprises an overhead liquid supply pipe 17 from which connecting supply pipes 18 emanate. Connecting supply pipes 18 are inserted into collars 13, and thereby terminate at the upper portions of collector electrodes 4.

In the operation of the improved electrical precipitator, gas to be cleaned enters electrical precipitator 1 through gas inlet 2 and passes upward in the space between collector electrodes 4 and charging electrode wires 5. Electrons and ions, resulting from the electrostatic potential maintained between collector electrodes 4 and charging electrode wires 5, attach themselves to the dust particles entrained in the gas to be cleaned. These particles, by virtue of their electrical charges, are drawn to and collected on the collector electrodes 4. Water to wash away the collected particles flows from supply pipe 17 through connecting supply pipes 18 and into porous collecting electrodes 4. The quantity of water supplied through pipes 17 and 18 to collector electrodes 4 is sufficient to create a static pressure head throughout the length of each collector electrode 4 despite the seepage of water through the porous walls of the collector electrodes 4. Once water seeps from the interior of collector electrodes 4, through the pores of the walls of collector electrodes 4, it reaches the exterior surface of the walls of collector electrodes 4 and there entrains the collected dust particles. The water and entrained particles flow down the collector electrodes 4 and fall from points 16 of collector electrodes 4 as either continuous or intermittent streams. The water and entrained dust particles are withdrawn from electrical precipitator 1 through liquid outlet 6, and the cleaned gas leaves electrical precipitator 1 through gas outlet 3. Flowing from points 16, the water does not strike connection links 12, weights 11, or charging electrodes 5. This arrangement precludes the possibility of a short circuit through these elements which support and restrain the charging electrode wires 5. This arrangement is best illustrated in FIG. 2 in which it can be seen that the vertical extensions of collector electrodes 4 pass between connection links 12, weights 11, and charging electrode wires 5. Also evident from FIG. 2 is that while collector electrodes 4 are illustrated as having lower portions terminating in downward vertical points, this feature is not necessary to insure that the descending water will not strike connecting links 12, weights 11, or electrode wires 5.

Figure 4:
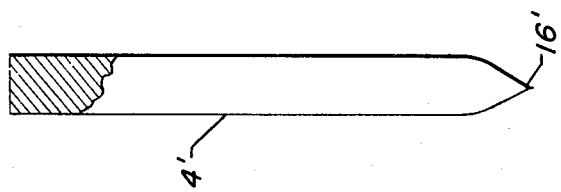
FIG. 4 is an alternative embodiment of a collector electrode of this invention.

FIG. 4 illustrates an alternative embodiment of the collector electrode of this invention. This modified collector electrode is a solid structure having a cylindrical upper portion and a lower portion which narrows to a single point. When this collector electrode embodiment is used in an electrical precipitator, a liquid supply means must discharge liquid directly on the upper portion of modified collector electrode 4'. The liquid then flows down the surface of collector electrode 4' and falls from the point 16' in a continuous or intermittent stream.

Figure 6:
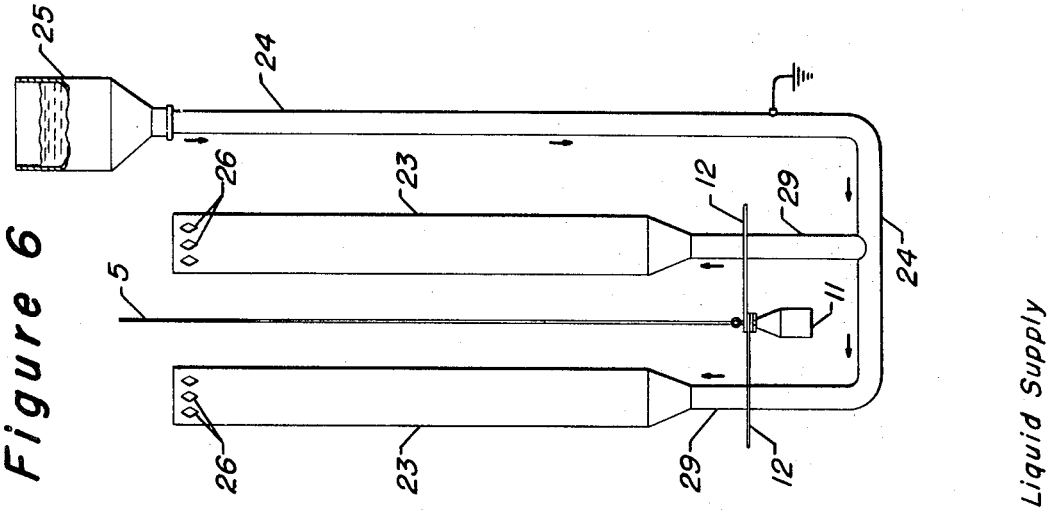
FIG. 6 is another alternative embodiment of the liquid means and the collector electrodes.
Figure 5:
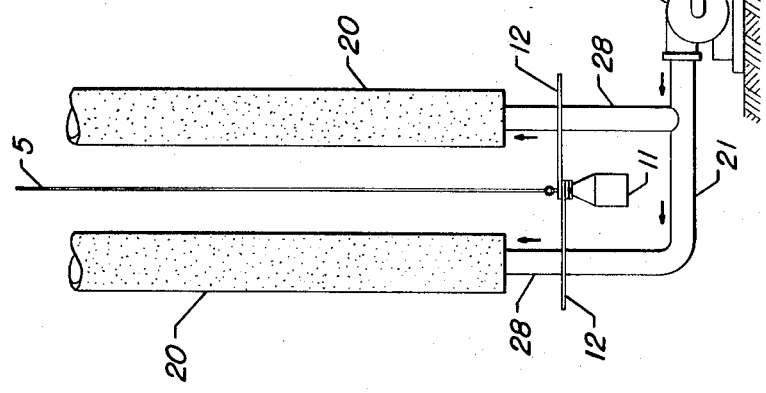
FIG. 5 is an alternative embodiment of the liquid supply means and the collector electrodes.

FIG. 5 and FIG. 6 illustrate alternative embodiments of collector electrodes and liquid supply means which can be used for carrying liquid to exterior surfaces of collector electrodes. Referring now to FIG. 5, there is shown an isolated view of the liquid supply means carrying liquid to collector electrodes. In this embodiment, the collector electrodes 20 are hollow, porous cylinders terminating in lower portions through which liquid is fed by a liquid supply means. The liquid supply means illustrated comprises a pump 19 connected to a liquid supply, and a supply pipe 21 passing underneath hollow, porous collector electrodes 20. Vertical branches 28 of supply pipe 21 are connected to the lower portions of each of the collecting electrodes 20. Each branch 28 of supply pipe 21 extends up into a collector electrode 20 and is sealed to the inner walls of that collector electrode. The pump 19 is of sufficient strength to force liquid to the upper portion of each collector electrode 20 and maintain that liquid level while the liquid seeps through the walls of each porous collector electrode 20 and flows down the exterior walls of each collector electrode 20, thereby entraining collected dust particles and falling in intermittent or continuous streams from the lower edges of collector electrodes 20 or flowing from collector electrodes 20 down supply branches 28. As in other embodiments, the liquid descending from collector electrodes 20 passes between the connection links 12, the weights 11, and charging electrode wires 5.

FIG. 6 differs from FIG. 5 only in that the liquid supply means, instead of requiring a pump, utilizes a supply pipe 24 connected to an overhead liquid supply 25. Vertical branches 29 of supply pipe 24 extend up to meet the lower portions of hollow collector electrodes 23 which narrow and are inserted into branches 29. Branches 29 and collector electrodes 23 are thereby sealed together. Collector electrodes 23 are not porous but are solid with apertures 26 in their upper portions. Collector electrodes 23 are not suspended from overhead supports, but instead are supported at their lower portions by vertical supply branches 29. Either the branches 29, the supply pipe 24, or the overhead supply 25 is connected to ground, thereby putting collector electrodes 23 at ground potential. During operation of the electrical precipitator, the liquid flows from the supply pipe 24 up into the collector electrodes 23 to the upper portions of collector electrodes 23, through apertures 26, and down the outer walls of collector electrodes 23. From the exterior surfaces of collector electrodes 23, the liquid flows down the outside surfaces of vertical branches 29 and from there out of the precipitator. The liquid thereby passes between the connection links 12, weights 11, and charging electrode wires 5.

While water is the only cleaning or washing liquid discussed herein, this invention is not restricted to water film electrical precipitators, but may be applied to any liquid film precipitator.

The foregoing detailed descriptions of several embodiments of this invention have been given for clearness of understanding only, and no unnecessary limitations should be understood therefrom, as other modifications will be obvious to those skilled in the art.

I claim as my invention:

1. In a liquid film electrical precipitator comprising a casing and having gas inlet and outlet means, a plurality of vertically extending collector electrodes disposed within said casing, a plurality of vertically extending charging electrode wires each located between and maintaining electric fields with several separate ones of said collector electrodes, a liquid supply means operatively associated with said precipitator for discharging liquid to the interior of said collector electrodes, each of said collector electrodes comprising a solid structure having an upper portion and having a lower portion which narrows to a single drip point, each of said electrode wires having a tensioning weight suspended therefrom at the bottom of each respective wire, a plurality of connecting links at said weights extending between and connecting adjacent charging electrode wires, each of said links passing between vertical extensions of said drip points, to thereby prevent arcing between said collector electrodes and said charging electrodes, each of said collecting electrodes being provided with means for the discharge of liquid from the interior thereof, means operatively constructed and arranged for providing said electrode wires with an electrical potential of a polarity opposite to ground and means operatively constructed and arranged for grounding said collector electrodes.

2. The improved apparatus of claim 1 further characterized in that each of said collector electrodes is provided with a collar at the upper end thereof, a support for said collars, each of said electrodes being suspended from said supports through said collars, said supports being fastened to the walls of said casing.

3. The improved apparatus of claim 2 further characterized in that said casing is grounded to thereby provide ground potential to said collector electrodes.

4. The improved apparatus of claim 1 further characterized in that said gas inlet means is positioned below said tensioning weights and said gas outlet means is positioned above said collector electrodes.

5. The improved apparatus of claim 1 further characterized in that said liquid supply means further comprises supply pipes an overhead liquid supply connected to said supply pipes, said supply pipes terminating at the upper portions of said collector electrodes.

6. The improved apparatus of claim 1 further characterized in that said collector electrodes are hollow porous cylinders.

References Cited

UNITED STATES PATENTS

| 1,325,136 | 12/1919 | Bradley | 55—157 |
| 1,329,817 | 2/1920 | Wolcott | 55—10 |
| 1,382,037 | 6/1921 | Welch | 55—151X |
| 1,766,422 | 6/1930 | Wintermute et al. | 55—119X |
| 1,793,665 | 2/1931 | Anderson | 55—155X |
| 1,903,644 | 4/1933 | Meston | 55—119X |
| 1,953,405 | 4/1934 | Hedberg | 55—119X |
| 2,592,508 | 4/1952 | Phyl | 55—157 |
| 3,154,682 | 10/1964 | Hartz et al. | 55—131X |

FOREIGN PATENTS

| 116,325 | 2/1930 | Austria | 55—149 |

DENNIS E. TALBERT, Jr., Primary Examiner

U.S. Cl. X.R.

55—120, 122, 147, 148, 151, 157, 233, 240, 242